United States Patent
Zhang et al.

(10) Patent No.: US 8,301,518 B1
(45) Date of Patent: Oct. 30, 2012

(54) SYSTEM AND METHOD FOR INVENTORY MANAGEMENT AND DISTRIBUTION

(75) Inventors: Mei Zhang, Lewisville, TX (US);
Shau-shiang Ja, Grapevine, TX (US);
Nancy Lee Lillo, Grapevine, TX (US);
Sameer Anand, Chicago, IL (US); Tuell Coleman Green, Euless, TX (US);
Steven James Oakley, Trophy Club, TX (US)

(73) Assignee: American Airlines, Inc., Fort Worth, TX (US)

( * ) Notice: Subject to any disclaimer, the term of this patent is extended or adjusted under 35 U.S.C. 154(b) by 288 days.

(21) Appl. No.: 12/850,281

(22) Filed: Aug. 4, 2010

Related U.S. Application Data

(63) Continuation of application No. 11/123,294, filed on May 6, 2005, now Pat. No. 7,778,891.

(60) Provisional application No. 60/569,550, filed on May 7, 2004.

(51) Int. Cl.
*G06Q 10/00* (2006.01)
(52) U.S. Cl. .......................... 705/28; 705/26.2
(58) Field of Classification Search ............. 705/16, 705/28, 51
See application file for complete search history.

(56) References Cited

U.S. PATENT DOCUMENTS

| | | | | |
|---|---|---|---|---|
| 5,053,970 A | * | 10/1991 | Kurihara et al. | 700/104 |
| 5,630,070 A | * | 5/1997 | Dietrich et al. | 705/7.23 |
| 7,778,891 B1 | | 8/2010 | Zhang et al. | |
| 2004/0254820 A1 | * | 12/2004 | Ishii | 705/7 |

OTHER PUBLICATIONS

John T Blake, Michael W Carter, A goal programming approach to strategic resource allocation in acute care hospitals, European Journal of Operational Research. Amsterdam: Aug 1, 2002. vol. 140, Iss. 3; p. 541 (Attached).*
Office Action mailed Mar. 4, 2009, by the USPTO, regarding U.S. Appl. No. 11/123,294.
Final Office Action mailed Oct. 7, 2009, by the USPTO, regarding U.S. Appl. No. 11/123,294.
Advisory Action mailed Jan. 13, 2010, by the USPTO, regarding U.S. Appl. No. 11/123,294.
Examiner Interview Summary mailed Feb. 24, 2010, by the USPTO, regarding U.S. Appl. No. 11/123,294.
Notice of Allowance mailed Apr. 12, 2010, by the USPTO, regarding U.S. Appl. No. 11/123,294.
John T. Blake, Michael W. Carter; A goal programming approach to strategic resource allocation in acute care hospitals; European Journal of Operational Research. Amsterdam: Aug 1, 2002. vol. 140, Iss. 3; pp. 541-561.

* cited by examiner

*Primary Examiner* — Scott Zare
*Assistant Examiner* — Rokib Masud
(74) *Attorney, Agent, or Firm* — Haynes and Boone, LLP

(57) ABSTRACT

A system and method for inventory management is provided. An indication of a removal of a first resource at a first location is received, and a risk value associated with the first resource at the location is calculated. A determination is made if the risk value is less than a predetermined threshold, and a request to transfer a second resource from a second location to the first location is generated.

18 Claims, 12 Drawing Sheets

| Line Station 42 | Part 44 | Donor Risk 46 | Desired Risk Level% 48 |
|---|---|---|---|
| Dallas/Fort Worth 102W | 34BZ6 | 10 days | 92% |
| La Guardia 86B | 34BZ6 | 9 days | 85% |
| Mexico City 2B | 34BZ6 | 5 days | 97% |

50

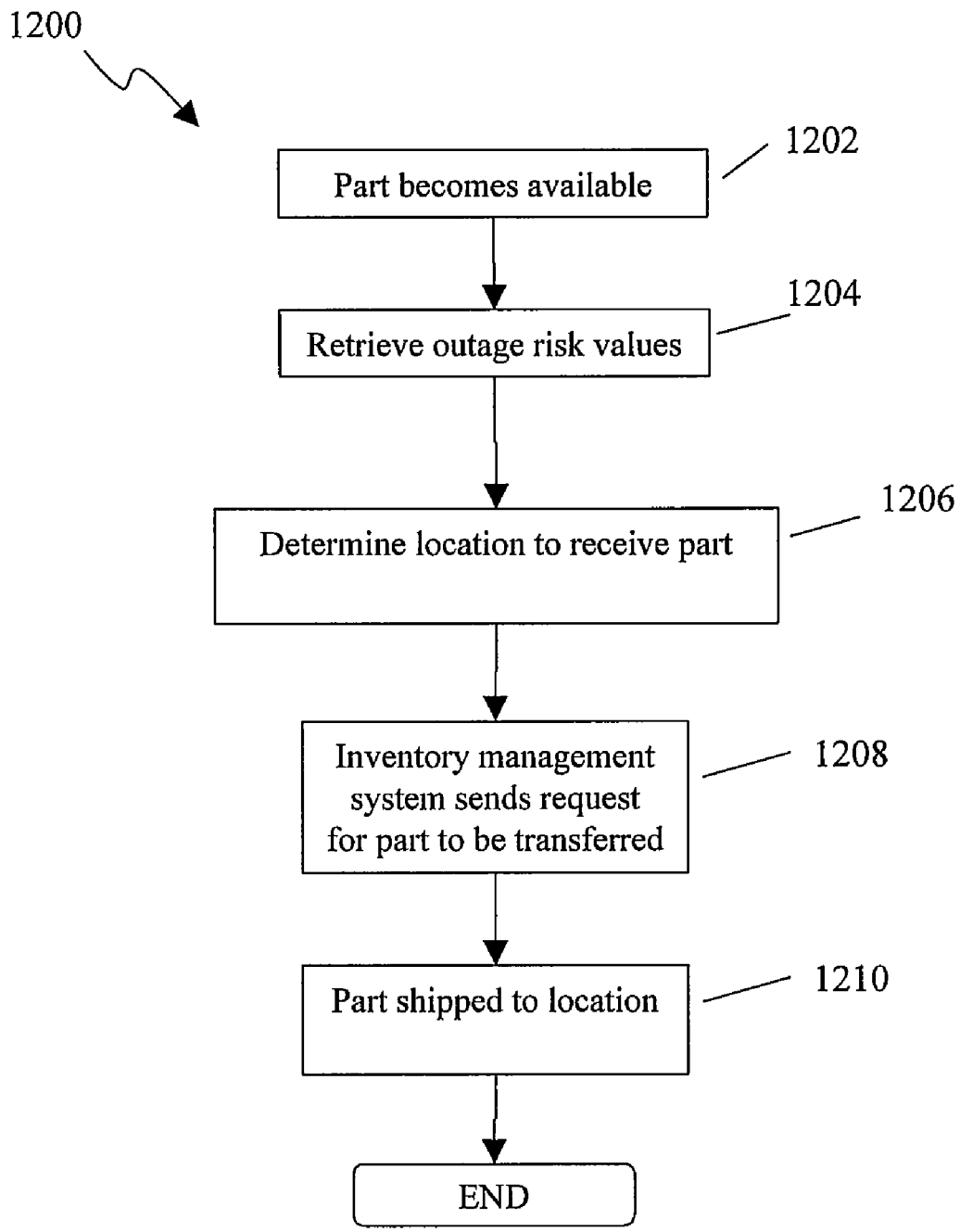

SYSTEM AND METHOD FOR INVENTORY MANAGEMENT AND DISTRIBUTION

CROSS-REFERENCE TO RELATED APPLICATIONS

This application is a continuation of U.S. patent application Ser. No. 11/123,294, filed May 6, 2005, which claims priority to U.S. Patent Application No. 60/569,550, filed May 7, 2004, the entire disclosures of which are incorporated herein by reference.

BACKGROUND

Many companies have facilities that require the usage of resources. In many instances, different facilities will have a different rate of usage of the resources. At times, a particular facility might have a faster rate of usage and need additional resources, while a different facility might have a slower rate of usage and have a surplus of resources.

BRIEF DESCRIPTION OF THE DRAWINGS

FIG. 2 is an example depiction of a donor list in accordance with one embodiment of the present invention.

FIG. 12 depicts the operational flow of an embodiment of the present invention.

DETAILED DESCRIPTION

Figure 1:
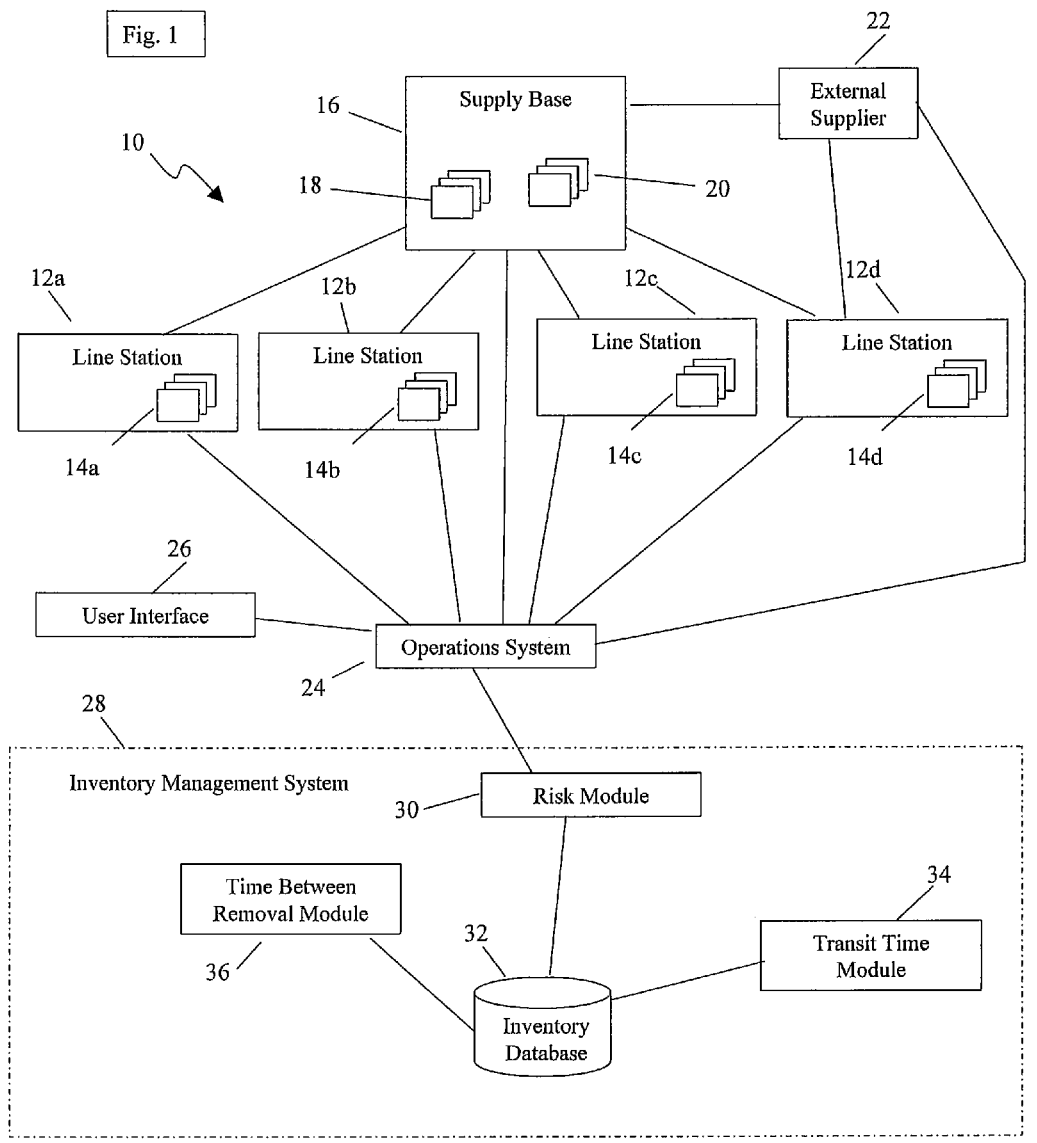
FIG. 1 is a diagram of an example embodiment of the present invention.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Referring now to FIG. 1, an embodiment 10 of a system and method for inventory management and distribution is shown. System 10 contains a facility 12. Facilities can be any location that uses resources. In one embodiment, a facility is a line station at an airport. In another embodiment, a facility is a sub-location at a line station at an airport. In a further embodiment, a line station has multiple locations. For example purposes, the system 10 contains four line stations 12a, 12b, 12c, and 12d.

At each line station 12 are resources 14. Resources 14 are anything that can be used or consumed at a facility, whether individuals or parts. For example purposes, the resources 14 are parts used in commercial aircraft. In this example, each line station has a corresponding set of parts 14a, 14b, 14c, and 14d.

The line stations are in communication with supply base 16. Supply base 16 contains an inventory of resources 18 and resources 20. For examples purposes, resources 18 and resources 20 are parts used in commercial aircraft. Parts 18 are parts that are either new or repaired. Parts 20 are parts that are in need of maintenance or repair (rotable parts).

It is contemplated that parts 14, 18, and 20 can represent a single type of part or multiple types of parts. In one embodiment, the parts 14, 18, and 20 each represent many types of parts that are differentiated by part numbers. Part numbers can be assigned by manufacturers or by the user of the parts. In one embodiment, parts can be assigned a company part number (CPN).

Supply base 16 may also be in communication with external supplier 22. External supplier 22 can be provider of new resources. While only one external supplier 22 is shown, it is contemplated that any number of external suppliers could be used in conjunction with this embodiment. Additionally, external supplier could be in communication with the operations system 24, as well as one or more line stations 12.

Each line station 12 is also in communication with an operations system 24. In this embodiment, the operations system provides instructions to the line stations 12 and supply base 16 about shipping parts to and from the supply base 16 and other line stations 12. Operations system 24 is also in communication with a user interface 26 and an inventory management system 28.

User interface 26 is capable of presenting different reports to a user of the system. Different reports could include backorders for parts, donor station lists, and distribution requests. In addition, user interface 26 could be used to provide scenario information or external inputs to change allocations of parts 14, 18, or 20. Further, user interface 26 could alter or override redistribution of parts that may be determined by the inventory management system 28. In one embodiment, the ability to override backorder priorities could be controlled based on user authority profiles.

In another embodiment, user interface 26 could be a web browser, and the communication link to operations system 24 could be the Internet or an intranet.

In one embodiment, the inventory management system 28 is comprised of a risk module 30, an inventory database 32, a time between removal module 34, and a transit time module 36.

Risk module 30 is capable of calculating risk values. Risk values can include the outage risk, the donor risk, and the resupply risk. Outage risk represents the number of days until the probability of an outage exceeds a desired risk level.

Donor risk represents the number of days until the probability of an outage exceeds a desired risk level if a part is removed from a station. Resupply risk represents the number of days until the probability of an outage exceeds a desired risk level when a part is added to a station. In one embodiment, an outage can mean that there are no parts at a line station. In another embodiment, an outage can mean that there are no parts at a line station and the line station needs a part. In another embodiment, an outage can mean that the number of parts in inventory at a line station are below an acceptable number. Desired risk level is a predefined threshold for the acceptable probability of an outage. The desired risk level can be set on a line station by line station basis or across the entire system.

Risk module 30 may also calculate risk values on a periodic basis or based on other triggering events within a line station or the system. Risk module 30 is also capable of communicating with inventory database 32. When a part 18 becomes available at supply base 16 or an external supplier 22, risk module 30 is capable of determining which line station 12 should receive the part 18. Additionally, when a part 14 at a line station 12 is needed at a different line station 12, risk module 30 is capable of determining which line station 12 should transfer its part 14 to the line station 12 in need of that part 14.

Inventory database 32 contains records regarding parts 14, new parts 18 and rotable parts 20. Inventory database 32 can also contain information regarding the risk for each part 14 at each line station 12 of that particular line station 12 needing an additional part 14. In one embodiment, the inventory database contains a TBR Table for storing time between removal data and a TT Table for storing transit time data.

Transit time module 34 communicates with the inventory database 32 to determine the expected length of time that a particular part would need to transfer from its departure point to a destination point. The departure point could be any line station 12, supply base 16 or external supplier 22. The destination point could be supply base 16, any line station 12, or external supplier 22. Transit time module 34 is also capable of generating a transit time record.

Time between removal module 36 communicates with inventory database 32 to calculate the length of time between the removal of a part at a station and a subsequent removal of the same type of part at the station. Time between removal module 36 is also capable of generating a time between removal record.

Referring now to FIG. 2, an example depiction of a donor list 40 that can be generated using the records in inventory database 32 (FIG. 1) is shown. Donor list 40 shows the line stations 42, the part 44, the associated donor risk 46 for part 44 at that the line station 42, and the desired risk level percentage 48 for part 44 at that line station 42. Using the sample data 50 shown in FIG. 2, if the Dallas/Fort Worth 102W line station was a donor of part 34BZ6, it would drop below the desired risk level percentage of 92% in 10 days, while if the La Guardia 86B line station was a donor of part 34BZ6, it would drop below its desired risk level percentage of 85% in 9 days. Since the Dallas/Fort Worth line station has the longest time before it would drop below its desired risk level percentage if it was a donor, this line station would be selected to donate one of its part 44 to the station with an unacceptable outage risk. In addition to FIG. 2, the donor list can also include a donor threshold, donor risk, critical threshold, time between removal value, transit time value, on hand quantity, and allocation for all the stations for the particular part where the parts at a line station are greater than zero.

Figure 3:
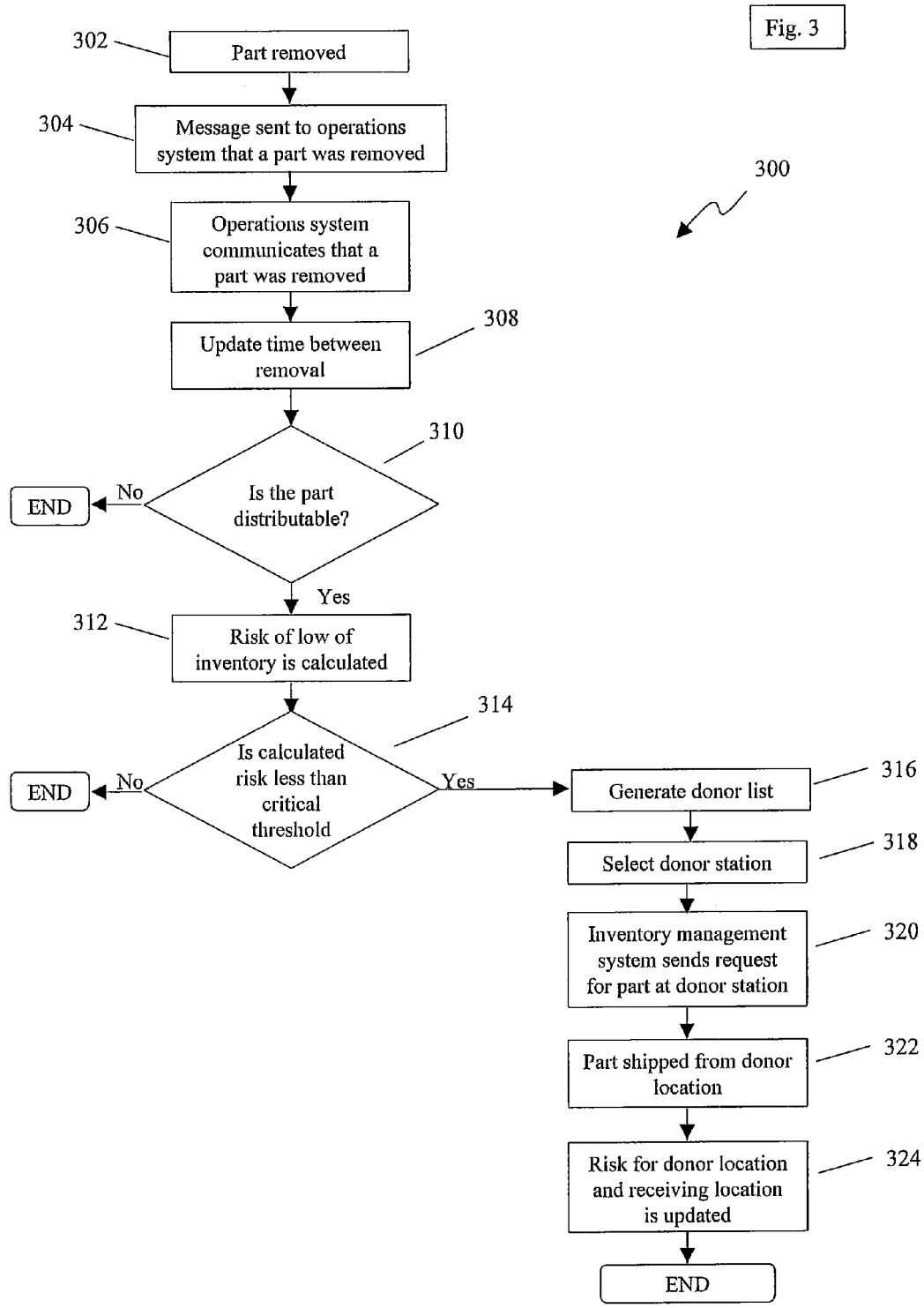
FIG. 3 depicts the operational flow of an embodiment of the present invention.

FIG. 3 refers to an operational flow 300 of an embodiment of the present invention. At step 302, a part is removed from a line station. Removal means that the part has been consumed by the line station to be placed into production. In another embodiment, scenario scripts can be used to test and verify different allocations and needs at line stations to simulate removals.

At step 304, the line station sends a message to the operations system indicating that a part was removed. In one embodiment, the message to the operations system contains information about the line station and the part number associated with the part.

At step 306, the operations system sends a message to the inventory management system that the part was removed from the line station. The inventory management system receives a part number for the part, the on-hand quantity remaining at the line station, and the date/time stamp of when the part was removed.

In one embodiment, the communication between the operations system and inventory management system is conducted using an extensible markup language (XML). The communication between the operations system and inventory management system may use six logical queues, where two queues can provide asynchronous messages from each system, two queues can be used for the request and reply messages from the inventory management system, and two queues can be used for the request and reply messages from the operations system.

At step 308, the time between removal value for that part at the line station is updated. The time between removal value is the time that elapses between the removal of a first part from a line station and a removal of a second of the same part from the same line station. In another embodiment, the time between removal value can also be a series of averages.

At step 310, it is determined whether the particular type of part that was removed from the line station is permitted or able to be distributed from another line station or the base station. In certain embodiments, it may be desirable that certain parts not be permitted to be distributed. If the part is not capable of being distributed in this manner, the process ends. If the part is able to be distributed, the process continues to step 312.

At step 312, one or more risk values for the part at that line station are calculated. In this particular embodiment, the risk values are calculated when there is a removal from the inventory (on hand quantity) of the part at the line station. The risk values could also be calculated when there is any change in the on hand quantity of the part at the line station.

At step 314, the outage risk is compared against a predetermined critical threshold. In one embodiment, the critical threshold is the minimum number of days that a line station can have until it receives a part from the supply base. If the risk is greater than the critical threshold, then the risk of running out of the part at that line station is at an acceptable level, and no further action is taken. If the risk is less than the critical threshold, then the number of parts at the line station is insufficient to prevent the line station from running out of parts before it receives a part replenishment from the supply base. In another embodiment, the critical threshold is the risk percentage that a line station will run out of a part within a given time frame. The risk among the line stations, at the end of the given time frame, is compared.

At step 316, a donor list is generated. The donor list is a list of line stations and the parts in inventory at those line stations, and the correlating donor risk of the part of that line station. In one embodiment, the donor list is ranked according to the donor risk. In one embodiment, the donor risk is the risk calculation using onhand quantity minus one in place of onhand quantity in the applicable equations, as described in more detail below. In one embodiment, all line stations can be included in the donor list. In another embodiment, line stations may have a corresponding donor flag that indicates whether the station is permitted to be a donor station, and only those line stations permitted to be a donor station are included on the donor list.

At step 318, the donor station is selected. In one embodiment, the donor station would be the line station with the highest number of days with the highest risk value (e.g., the most number of days until the line station's probability of an outage is less than the line station's customer service level). In another embodiment, the donor station would be the line station with the highest number of days until that line stations runs out of the part less the transit time for the part to be shipped from the donor station to the line station needing the part. In an additional embodiment, the donor station could be the main supply base. In such an embodiment, restrictions could be placed so that the main supply base is selected only when the need for a part reaches a critical threshold.

At step 320, the inventory management system sends a request for the part to be transferred from the selected donor station. In one embodiment, the request can be sent to the operations system, and the operations system communicates with the donor station and requests transfer of the part from the donor station to the line station needing the part. In one embodiment, the messages to the operations system may utilize eight physical queues.

At step 322, the donor station receives the request and ships the part to the line station needing the part. In another embodiment, the part is transferred to the main supply base, and then routed to the destination line station. At step 324, the risk of running out of the part is re-calculated for the donor station and the line station that receives the part.

In another embodiment, an analysis of the risk over the entire system can be run before an outage occurs at any station. In this embodiment, the risk can be used to determine if an outage of one part at any station causes a problem because even though all stations may currently have sufficient stock, none of the stations would be able to become donors without themselves becoming critical.

In an additional embodiment, the inventory management system can query to determine if the redistribution of the part from the donor station to the line station has successfully occurred. In some cases, this query can be performed every two hours. Additionally, if twenty-four hours has elapsed, or another predetermined time period, the inventory management system can send a message to the operations system to cancel the part redistribution and create a new request for a part to be shipped from another station on the donor list.

Figure 4:
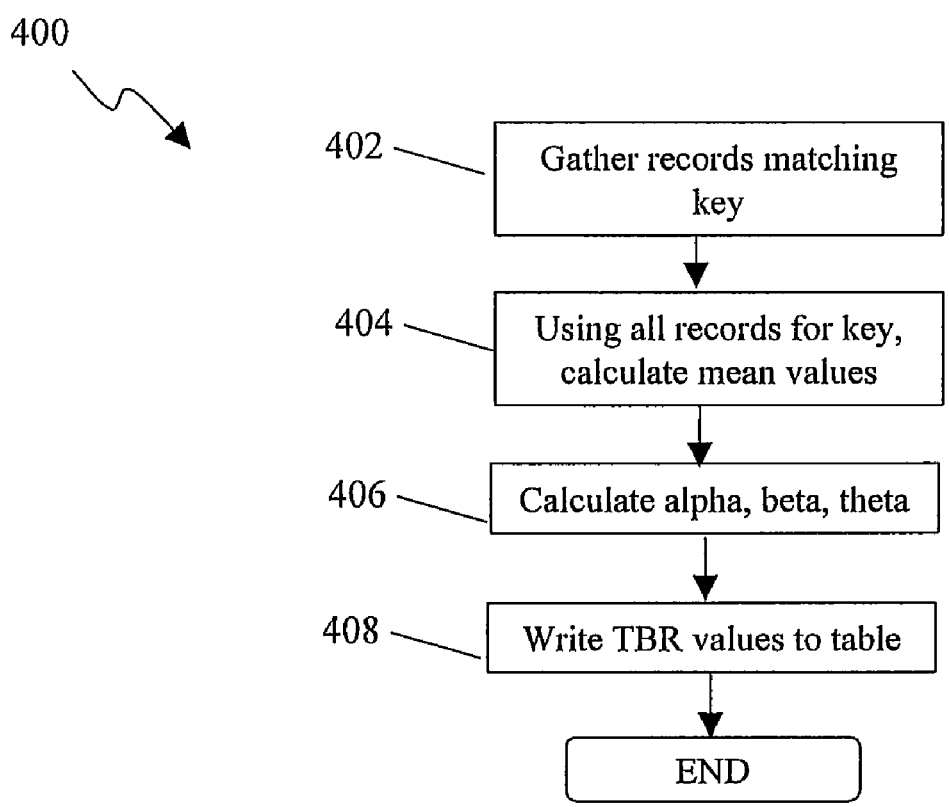
FIG. 4 depicts the operational flow of creating time between removal records in accordance with one embodiment of the present invention.

Referring now to FIG. 4, an example operational flow 400 of creating time records is shown. At step 402, records pertaining to the part are retrieved from the inventory database. In one embodiment, the records contain the actual time between removal for the part at a line station.

At step 404, the mean value of the actual time between removal values for the part is calculated. In one embodiment, three different mean values are calculated in accordance with the following:

Smooth mean $TBR$=mean(all actual $TBR$)

Smooth mean $TBR2$=mean(all actual $TBR$)2

Smooth mean $TBR3$=mean(all actual $TBR$)3

Minimum $TBR$=min(all actual $TBR$)

$TBR$ obs count=number of actual $TBR$ values

Where:
All actual TBR are all of the time values between when a type of part was removed from a particular line station and when a subsequent part of the same type was removed from the same line station.

At step 406, alpha, beta, and theta values are calculated. The alpha, beta, and theta values are the standard parameters used when calculating a gamma distribution equation. At step 408, the mean TBR value (or mean values smooth mean TBR, smooth mean TBR2, smooth mean TBR3, and minimum TBR), TBR obs count, alpha value, beta value, and theta value for the part are stored in the inventory database.

The time between removal values could be updated on a periodic basis. In one embodiment, when the time between removal values are updated, each part number at each line station is updated.

Figure 5:
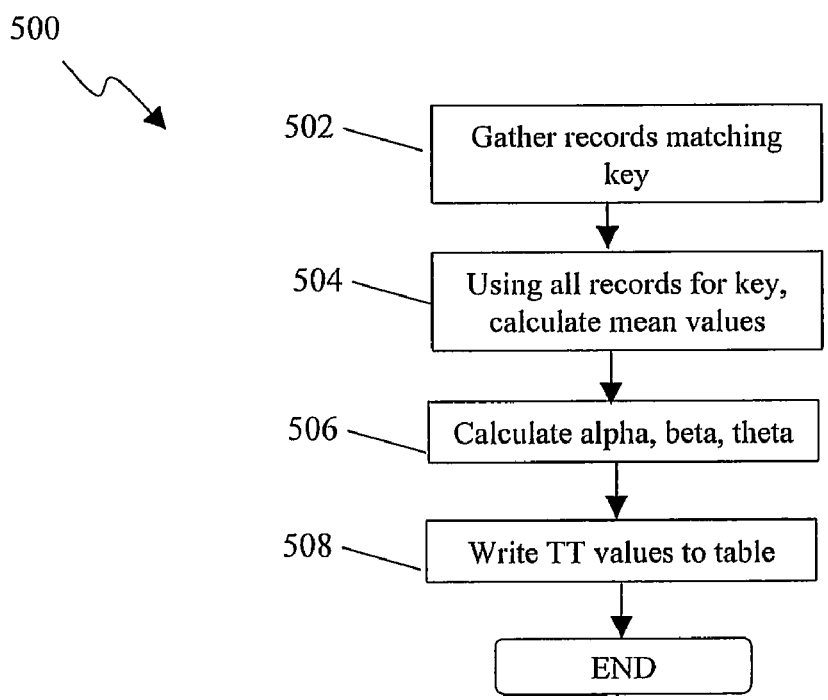
FIG. 5 depicts the operational flow of creating transit time records in accordance with one embodiment of the present invention.

Referring now to FIG. 5, an example operational flow 500 of creating transit time records is shown. At step 502, records pertaining to the part are retrieved from the inventory database. In one embodiment, the records contain the actual transit time for transferring a part from the main supply base to a particular line station and from each line station to each of the other line stations. Transit time can also include the time required for a part to be transferred from an external supplier to the line station, from an external supplier to the main supply base, or from an external supplier to the main supply base and then to the line station.

At step 504, the mean value of the actual transit time values for the part is calculated. In one embodiment, three different mean values are calculated in accordance with the following:

smooth mean $TT$=mean(all actual $TT$)

smooth mean $TT2$=mean(all actual $TT$)$^2$ smooth mean $TT3$=mean(all actual $TT$)$^3$ minimum $TT$=min(All Actual $TT$)

$TT$ obs count=number of actual $TT$ values

Where:
All actual TT are all of the time values for transferring a part from the main supply base or external supplier to a particular line station and from each line station to each of the other line stations.

These calculations generate the mean values using all actual transit time values. In one embodiment, only those actual TT values during the previous two years of data are used for the calculations. However, in other embodiments, different amounts of historical transit time values can be used.

At step 506, alpha, beta, and theta values are calculated. The alpha, beta, and theta values are the standard parameters used when calculating a gamma distribution equation. At step 508, the mean transit time value (or mean values smooth mean TT, smooth mean TT2, smooth mean TT3, and minimum TT), TT obs count, alpha value, beta value, and theta value for the part are stored in the inventory database.

The transit time values could also be updated on a periodic basis. In one embodiment, when the transit time values are updated, each transit time value of transferring a part from the main supply base to a particular line station and from each line station to each of the other line stations is updated.

Figure 6:
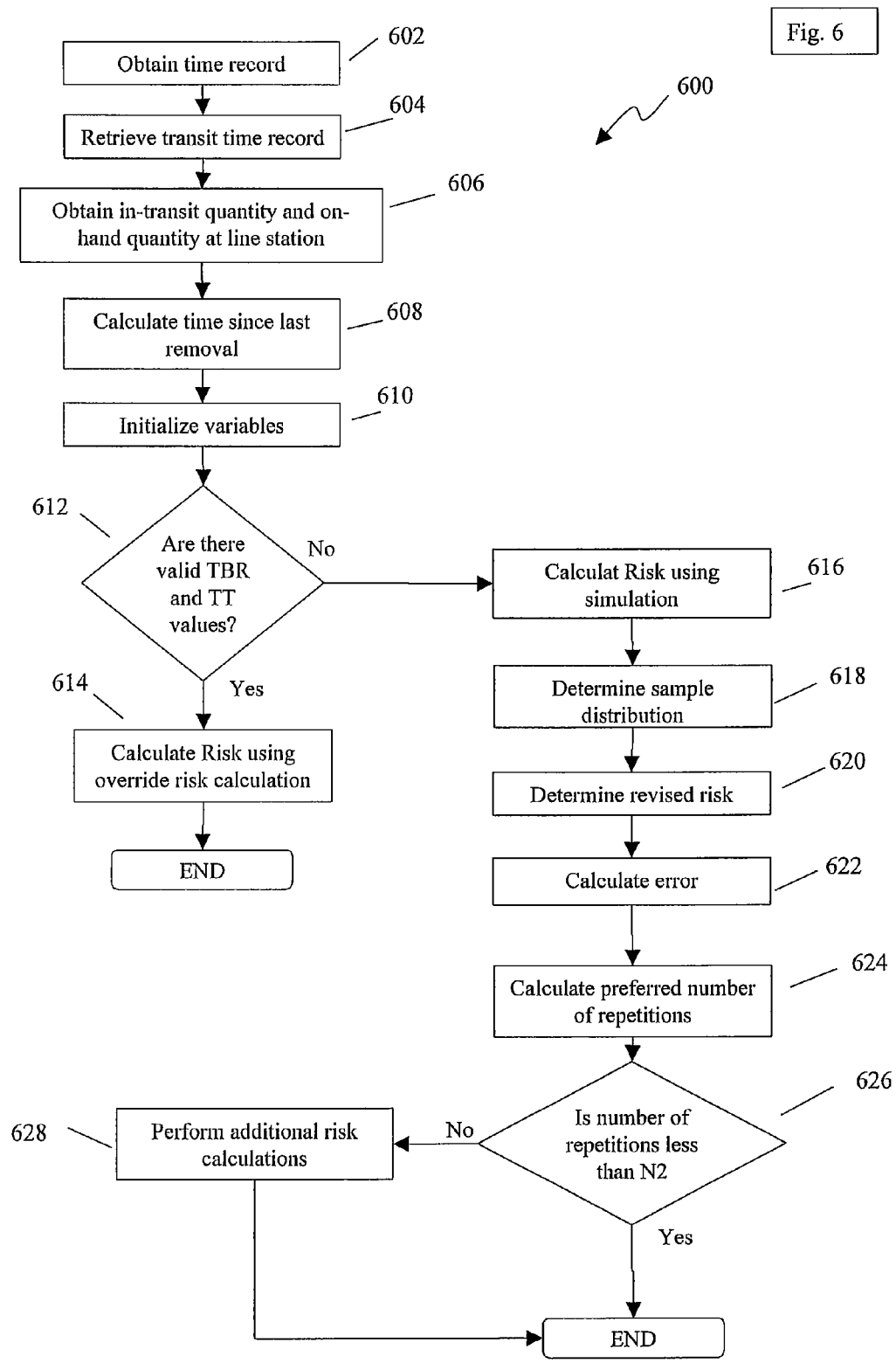
FIG. 6 depicts the operational flow of calculating the risk in accordance with one embodiment of the present invention.

Referring now to FIG. 6, an example operational flow 600 of calculating risk values, such as outage risk, donor risk, and resupply risk, is shown. In one embodiment, risk is calculated when a part is removed from a line station. In another embodiment, risk can be calculated when a new part or repaired part appears at a line station. In an additional embodiment, risk can be calculated whenever the inventory at a line station (the onhand quantity) is changed. In a further embodiment, the risk can be calculated for any line station that has not been recalculated within a particular time frame. In yet another embodiment, that time frame could be twenty-four hours. The different risk values can be calculated by adjusting the appropriate on-hand quantity parameter to reflect the type of risk value being calculated.

At step 602, the time record for a part at a line station is retrieved from the inventory database. In one embodiment, the time record contains the override TBR value, the override TBR date range, the time of last removal for a part, alpha value, beta value, theta value, and the mean TBR from the TBR table. If no time record exists for the part at that station, then a default record can be used.

At step 604, the transit time record for the part at a line station is retrieved from the inventory database. In one embodiment, the transit time record contains the override TT value, the override TT date range, alpha value, beta value, and theta value from the TT table.

At step 606, the amount of parts in transit and the on-hand quantity for the applicable line station is obtained from the inventory database. At step 608, the time since last removal (TSLR) is calculated. In one embodiment, the TSLR is the difference between the current time and the time of last removal for the part at that station.

At step 610, certain variables used in calculating the risk are initialized, depending on the equations to be used in calculating the risk. In one embodiment, the following variables are used and initialized as follows:
SUM1=0
SUMSQE=0
N1=500
N2=30
E=0.5
Q2=0.05
P1=[100−desired risk level]/100
CAP=200
Default TT=3

At step 612, the method determines whether there are acceptable TBR and TT values in the time record. In one embodiment, acceptable values for TBR would be an override TBR value greater than 0 or a global default TBR value greater than 0, and an override TT value greater than 0 or a global default TT value greater than 0. If there are acceptable TBR and TT values in the time record, then the process proceeds to step 614. Otherwise, the process proceeds to step 616.

At step 614, the risk is calculated using the override risk calculation. In one embodiment, the override risk calculation is the following equation:

$$\text{Risk}=\max(TBR-TSLR,0)+\max(TSLR-\text{alpha}*TBR,0)+TBR*OHT-OTT$$

Where:
alpha is an user defined value (in one embodiment, alpha=1)
OHT=Max[on hand quantity, 0]+Max[parts in transit,0]* Max{Max[((TBR−(0.5*TT))/override TBR),0],0.5}. OHT represents the onhand quantity and the number of parts in transit. In this embodiment, the number in parts in transit is a weighted value.

TBR=override TBR (or global default TBR). In one embodiment, the override value is preferred over the global default value.

TT=override TT (or global default TT). In one embodiment, the override value is preferred over the global default value.

At this point, the risk has been calculated.

At step 616 (where there were not acceptable TBR or TT values), the risk is calculated using simulation. In one embodiment, risk can be calculated using simulation as shown by the following pseudo-code:
T=TSLR
OHT=Max[on hand quantity,0]+Max[parts in transit,0]* Max{Max[((smooth mean TBR−(0.5*TT))/smooth mean TBR),0],0.5}
Q1=random number different from S1
S1=random number different from S2
S2=random number different from Q1
CdfGamma=the value returned by the cumulative distribution function using the values: alpha value for the TBR, beta value for the TBR, and T—theta value for the TBR.
InvGamma1=INV.GAMMA{[Q1*(1−CdfGamma)+CdfGamma], alpha value for the TBR}
InvGamma2=INV.GAMMA (S1, alpha value for the TT)
InvGamma3=INV.GAMMA (S2, OHT*alpha value for the TBR)
$Z_i$=beta value for the TBR*InvGamma3+OHT*theta value for the TBR
$X_i$=theta value for the TBR+beta value for the TBR*InvGamma1−T
Temp14=theta value for TT+beta value for TT*InvGamma2
If Temp14 is greater than 14 then:
    $TT_i$=smooth mean TT
If Temp14 is not greater than 14 then:
    $TT_i$=Temp 14
$\text{Risk}_i=X_i+Z_i-TT_i$
$SUM1=SUM1+CT_i$ The value of 14 that Temp14 is compared against is used to prevent transit times greater than 14 days. This value could be modified as desired to limit transit times of varying durations. INV.GAMMA represents the inverse gamma distribution equation.

At step 618, a sample distribution is determined. In one embodiment, the sample distribution can be determined by repeating the risk calculation as described in step 618 a number of times (N1). Each iteration of the risk calculation stores the $X_j$, $Z_i$, $TT_i$ and $\text{Risk}_i$ values. The values can be sorted by ascending value of $\text{Risk}_i$. The ith=[N1*P1]th is also stored.

At step 620, the revised risk value is determined. In one embodiment, the revised risk value is the $\text{Risk}_i$ value determined in the risk calculation. In another embodiment, step 618 can be repeated a number of time (N2) and the revised risk value can be the SUM($\text{Risk}_i$)/N2. In a further embodiment, step 618 can be repeated N2 times, where Q1, S1, and S2 have different respective values in each iteration, and the revised risk value can be the SUM($\text{Risk}_i$)/N2.

At step 622, the margin of error for the revised risk value is calculated. In one embodiment, sum of square errors within the stored values is calculated and then the standard deviation is determined using the following equations:

$$SUMSQE=SUMSQE+(\text{Risk}_i-\text{revised risk value})^2$$

$$S=\text{Square Root of } \{SUMSQE/N2*(N2-1)\}$$

At step 624, the number of repetitions of the risk calculations that need to be performed to reduce the error value to less than a threshold (NReps) is determined. In one embodiment, the threshold represents a number of days. In this embodiment, the error is the E value (0.5).

$$NReps=MIN\{ROUND[(TINVERSE(Q2, (N2-1)*S/E)^2, CAP\}$$

At step 626, the method determines whether the number of needed repetitions, NReps, is less than N2. If so, then the revised risk value is used as the risk score and the process ends. If the number of repetitions, NReps, is not less than N2, then the method proceeds to step 628.

At step 628, the previous steps are repeated until the N2 equals NReps and the revised risk value that is calculated is calculated on the basis of all of the $Risk_i$ values.

Figure 7:
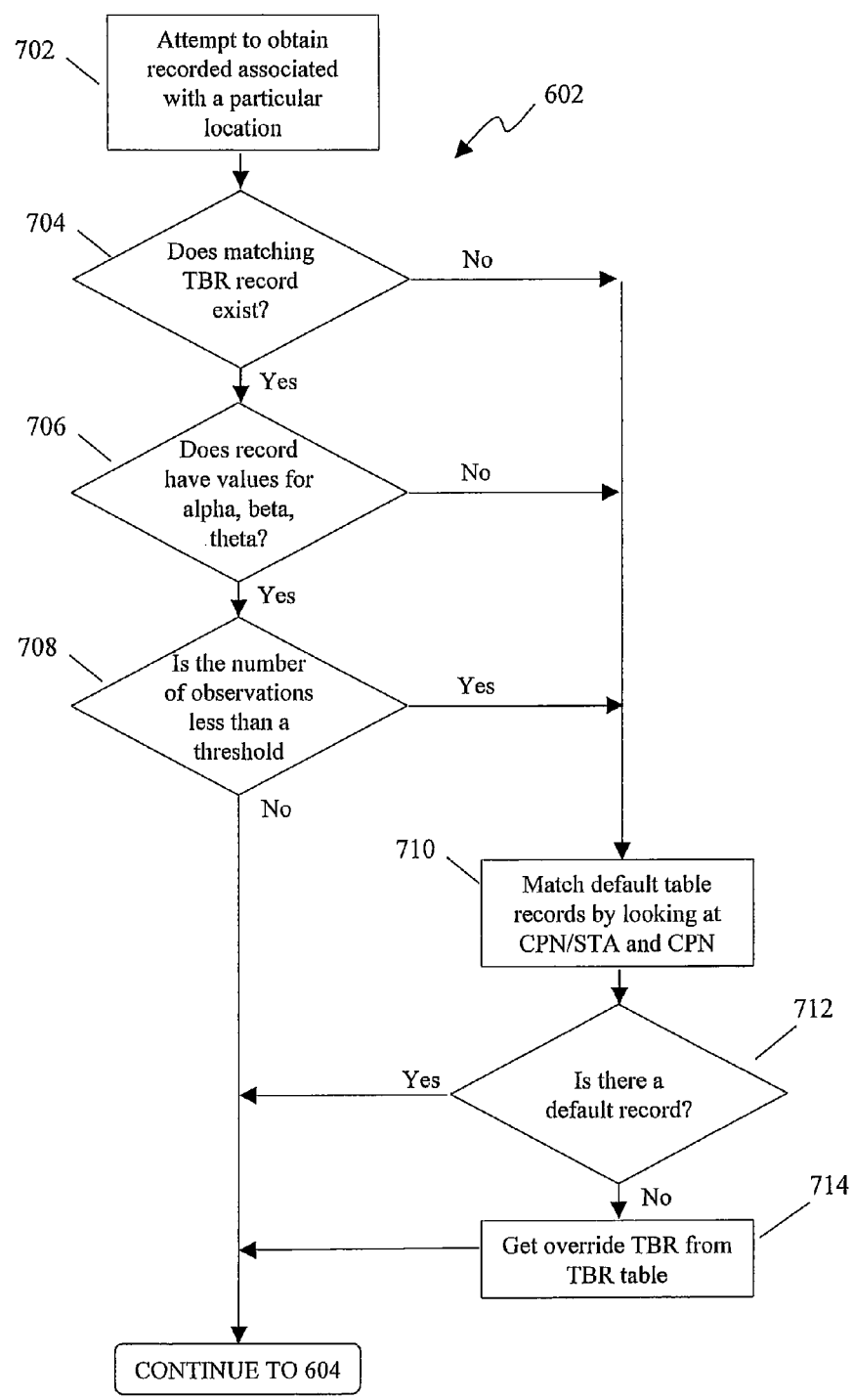
FIG. 7 depicts the operational flow of obtaining a time record in accordance with one embodiment of the present invention.

Referring now to FIG. 7 is a example flowchart 602 of obtaining a time record using a time between removal (TBR) value in one embodiment of the present invention. At step 702, a record associated with a particular location is attempted to be retrieved. At step 704, the method determines whether a record was able to be retrieved. If no record matched the particular location, the method proceeds to step 710. If a record matched the particular location, the method proceeds to step 706.

At step 706, it is determined whether the record contains non-null values for alpha, beta, and theta. If alpha, beta, and theta have values, the method proceeds to step 708. If alpha, beta, and theta are null, the method proceeds to step 710.

At step 708, the number of observations in the record is reviewed. If the number of observations is less than a particular threshold, then the method proceeds to step 710. If the number of observations exceed the threshold, then the current values contained in the record can be used in the risk calculation. In one embodiment, the threshold can be 5.

At step 710, a default record is retrieved. In one embodiment, default records can be located based on a part at a particular location or based on the part alone. In another embodiment, the distribution is approximated based on the history of a similar station, or the system level usage pattern.

At step 712, the method determines if a default record was successfully retrieved. If not, then the method proceeds to step 714. If a default record was successfully retrieved, then the current values in the default record can be used in the risk calculation.

At step 714, the override TBR value from the TBR table is retrieved, and this value is used in the risk calculation.

Figure 8:
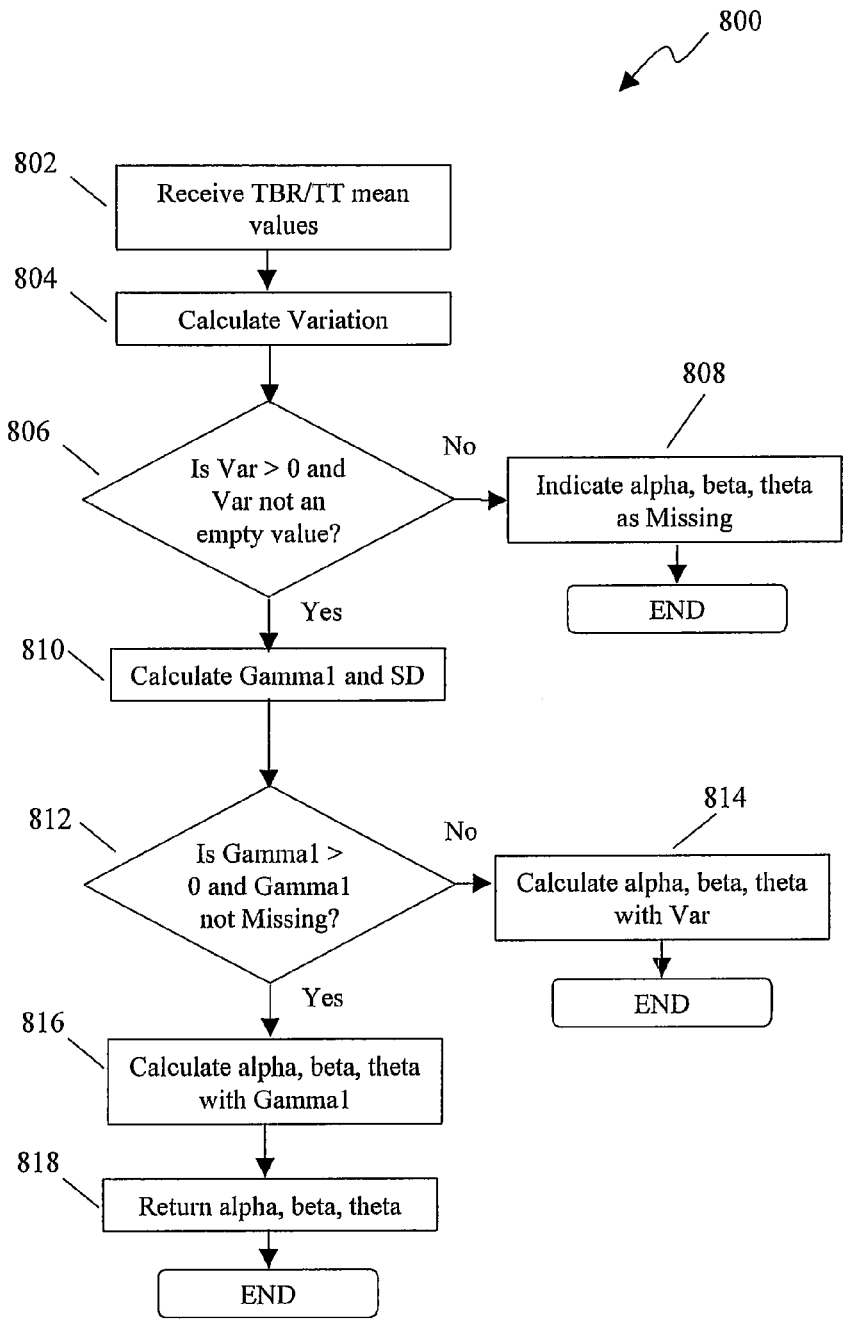
FIG. 8 depicts the operational flow of calculating alpha, beta, and theta values in accordance with one embodiment of the present invention.

Referring now to FIG. 8, is an example flowchart 800 of calculating alpha, beta, and theta values in one embodiment of the present invention. At step 802, the mean values associated with the TBR for a location and associated with the TT for a location are retrieved.

At step 804, the variation is calculated using the following equation:

$$Var=\text{smooth mean } TBR2-(\text{smooth mean } TBR)^2$$

At step 806, the method determines whether Var is greater than 0 and that Var is not an empty value. If so, then method proceeds to step 810. If not, then the method proceeds to step 808.

At step 808, the alpha, beta, and theta values cannot be calculated and are marked as missing.

At step 810, the following calculations are performed:

$$Num=\text{smooth mean } TBR3-(3*\text{smooth mean } TBR2*\text{smooth mean } TBR)+2*(\text{smooth mean } TBR)^3$$

$$Denom=VAR^{3/2}$$

$$Gamma1=Num/Denom$$

$$SD=\text{Square Root}(Var)$$

At step 812, the method determines whether Gamma1>0 and that Gamma1 is not an empty value. If so, the method proceeds to step 814. If not, the method proceeds to step 816.

At step 814, alpha, beta, and theta are calculated as follows:

$$alpha=(\text{smooth mean } TBR)^2/Var$$

$$beta=Var/\text{smooth mean } TBR$$

$$theta=0$$

At step 816, alpha, beta, and theta are calculated as follows:

$$alpha=4/Gamma1^2$$

$$beta=(SD*Gamma1)/2$$

$$theta=Max[Min[\text{smooth mean } TBR-(2*SD/Gamma1), \text{minimum } TBR),0)$$

At step 818, the alpha, beta, and theta values are communicated to the requesting module.

While the calculations and formulas shown in FIG. 8 use the values related to TBR, it is contemplated that the alpha, beta, and theta values can be calculated for TT using the same steps and replacing the TBR mean values with the corresponding TT mean values.

Figure 9:
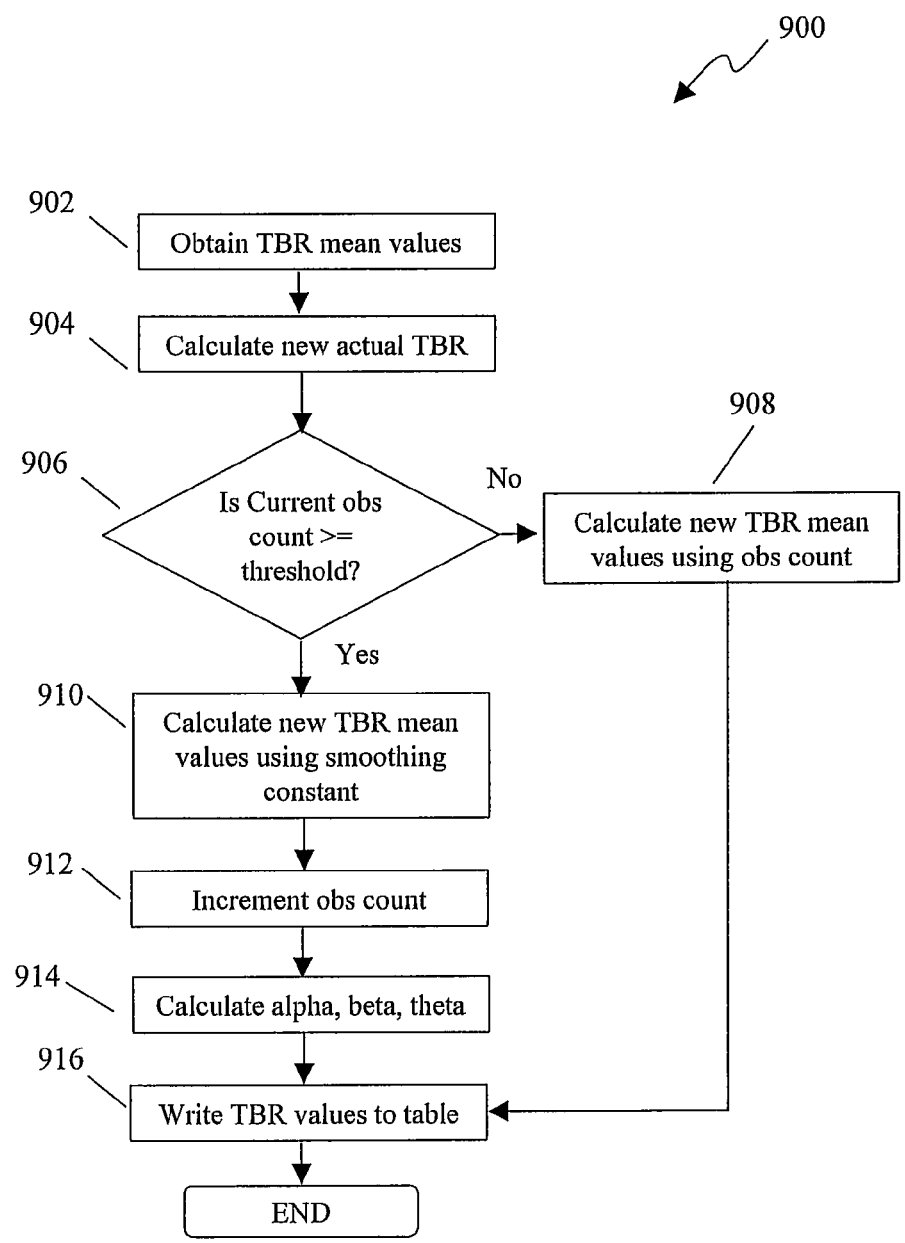
FIG. 9 depicts the operational flow of updating the time between removals values in accordance with one embodiment of the present invention.

Referring now to FIG. 9, an example flowchart 900 of updating the Time Between Removals value in an embodiment of the present invention is shown. At step 902, the mean time between removal values for a part at a line station are retrieved. In one embodiment, the smooth mean TBR, smooth mean TBR2, smooth mean TBR3, min TBR, current actual TBR, obs count, current removal date and time for the part at a line station are retrieved. In another embodiment, if there is no mean values for the part at a line station or the obs count value is null, then the TBR cannot be calculated, but the removal date and time of removal are stored in a new record with a null TBR value and an obs count=0.

At step 904, the new actual TBR is calculated. In one embodiment, the new actual TBR is calculated using the following equation:

$$\text{New actual } TBR=(\text{new removal date}-\text{current removal date})+(\text{new removal time}-\text{current removal time})$$

At step 906, the current obs count value is compared against a predetermined threshold value. In one embodiment, the threshold value can be 4. Additional threshold values could be used in order to obtain a sufficient number of observations to provide an accurate value for use in the calculations. If the current obs count value is less than the threshold value, the method proceeds to step 908. If the obs count value was greater than or equal to the threshold value, the method continues to step 910.

At step 908, the Time Between Removals values are calculated in accordance with the following equations:

$$\text{New smooth mean } TBR=(\text{obs count})/(\text{obs count}+1)*\text{smooth mean } TBR+1/(\text{obs count}+1)*\text{new actual } TBR$$

New smooth mean $TBR2=$(obs count)/(obs count+1)*
smooth mean $TBR2+1/$(obs count+1)*new actual $TBR^2$ New smooth mean $TBR3=$(obs count)/(obs count+1)*
smooth mean $TBR3+1/$(obs count+1)*new actual $TBR^3$ New minimum $TBR$=min[minimum $TBR$,new actual $TBR$]

At step 910, the Time Between Removals values are calculated in accordance with the following equations:

Smoothing Alpha(SA)=0.2

New smooth mean $TBR=(1-SA)$*smooth mean $TBR+$ SA*new actual $TBR$

New smooth mean $TBR2=(1-SA)$*smooth mean $TBR2+$SA*new actual $TBR2$

New smooth mean $TBR3=(1-SA)$*smooth mean $TBR3+$SA*new actual $TBR^3$

New minimum $TBR$=Min(minimum $TBR$,new actual $TBR$)

At step 912, the obs count value is incremented by one. At step 914, the alpha, beta, and theta values are calculated.

At step 916, the new Time Between Removals values, new actual TBR, minimum TBR, alpha, beta, theta, obs count and new current removal date and time values are stored in the TBR Table.

Figure 10:
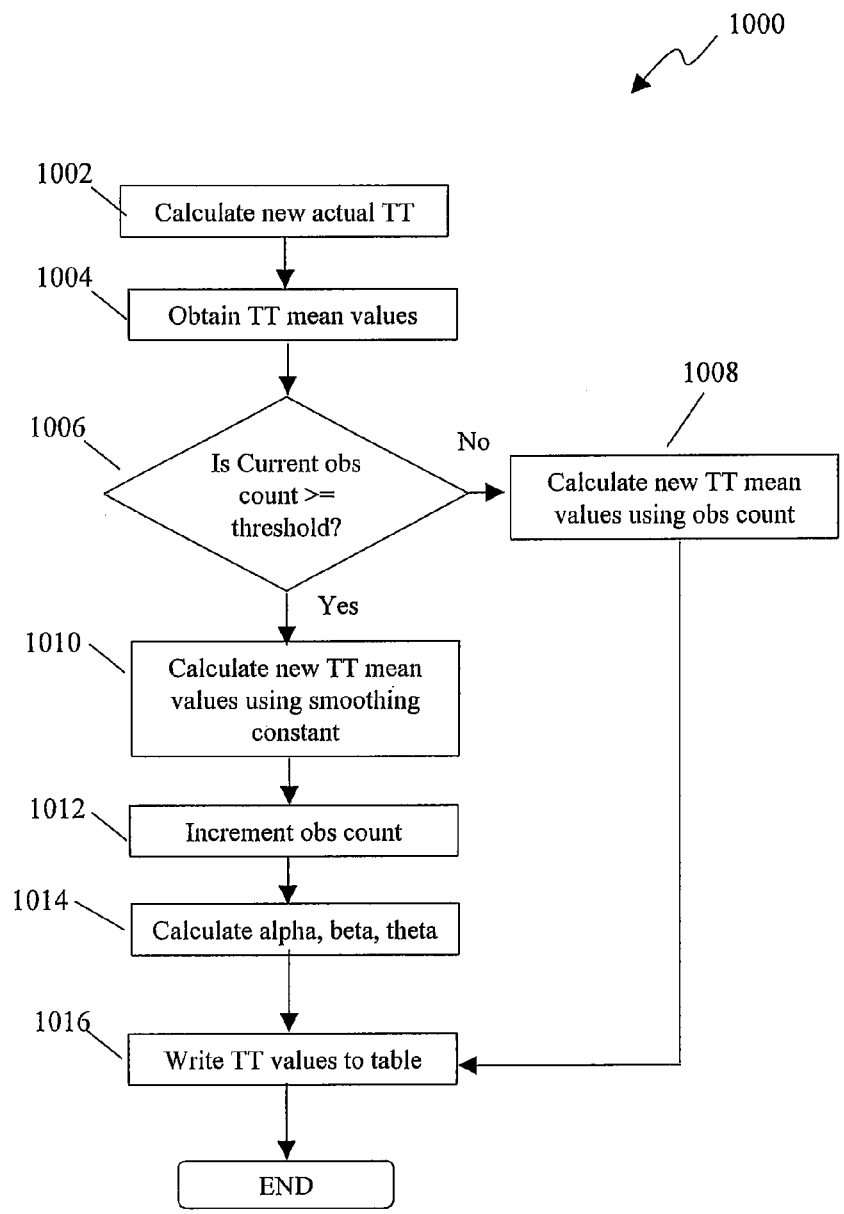
FIG. 10 depicts the operational flow of updating transit time values in accordance with one embodiment of the present invention.

Referring now to FIG. 10 an example flowchart 1000 of updating the Transit Time value in an embodiment of the present invention is shown.

At step 1002, the new actual TT value is calculated. In one embodiment, the New Actual TT value is calculated using the following equation:

New Actual $TT$=(receipt date−ship date)+(receipt time−receipt time)

At step 1004, the mean transit time values for a part at a line station are retrieved. In one embodiment, the smooth mean TT, smooth mean TT2, smooth mean TT3, minimum TT, and obs count for the part at a line station are retrieved. In another embodiment, the values for the part at the supply base can be retrieved.

At step 1006, the current obs count value is compared against a predetermined threshold value. In one embodiment, the threshold value can be 4. Additional threshold values could be used in order to obtain a sufficient number of observations to provide an accurate value for use in the calculations. If the current obs count value is less than the threshold value, the method proceeds to step 1008. If the obs count value was greater than or equal to the threshold value, the method continues to step 1010.

At step 1008, the transit time values are calculated in accordance with the following equations:

New smooth mean $TT=$(obs count)/(obs count+1)*
smooth mean $TT+1/$(obs count+1)*New Actual $TT$ New smooth mean $TT2=$(obs count)/(obs count+1)*
smooth mean $TT2+1/$(obs count+1)*New Actual $TT^2$ New smooth mean $TT3=$(obs count)/obs count+1)
*smooth mean $TT3+1/$(obs count+1)*New Actual $TT3$ New minimum $TT$=min[minimum $TT$,new actual $TT$]

At step 1010, the transit time values are calculated in accordance with the following equations:

Smoothing Alpha(SA)=0.2

New smooth mean $TT=(1-SA)$*smooth mean $TT+$SA*New Actual $TT$

New smooth mean $TT2=(1-SA)$*smooth mean $TT2+$SA*New Actual $TT^2$

New smooth mean $TT3=(1-SA)$*smooth mean $TT3+$SA*New Actual $TT^3$

New minimum $TT$=Min(minimum $TT$,new actual $TT$)

At step 1012, the obs count value is incremented by one. At step 1014, the alpha, beta, and theta values are calculated.

At step 1016, the new transit time values, minimum TT, alpha, beta, theta, and obs count are stored in the TT Table.

Figure 11:
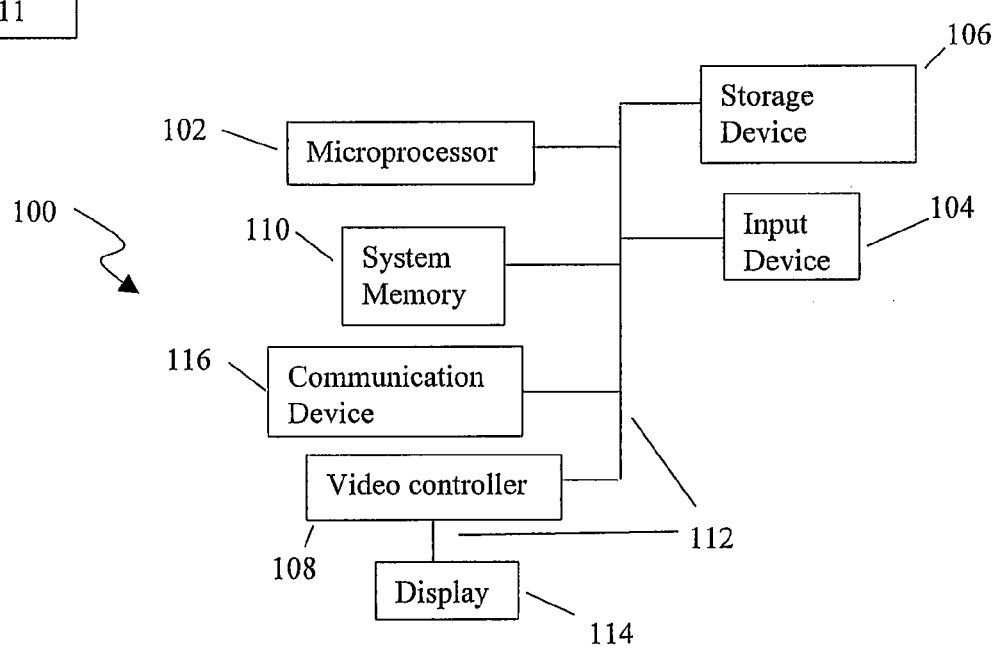
FIG. 11 is a diagram of an example system for implementing an embodiment of the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 11, an illustrative node 100 for implementing an embodiment of the method is depicted. Node 100 includes a microprocessor 102, an input device 104, a storage device 106, a video controller 108, a system memory 110, and a display 114, and a communication device 116 all interconnected by one or more buses 112. The storage device 106 could be a floppy drive, hard drive, CD-ROM, optical drive, or any other form of storage device. In addition, the storage device 106 may be capable of receiving a floppy disk, CD-ROM, DVD-ROM, or any other form of computer-readable medium that may contain computer-executable instructions. Further communication device 116 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

FIG. 12 refers to an operational flow 1200 of an embodiment of the present invention. At step 1202, a part becomes available at a supply base or from an external supplier. At step 1204, the outage risk values associated with that type of part are retrieved for any line station that uses that type of part. At step 1206, the outage risk values are analyzed to determine which line station has the lowest number of days until its desired risk level drops below an acceptable level for that line station. At step 1208, the inventory management system sends a request for the part to be transferred to the selected station. In one embodiment, the request can be sent to the operations system, and the operations system communicates with the source of the part and requests transfer of the part to the selected line station. At step 1210, source of the part receives the request and ships the part to the line station needing the part. In another embodiment, the part is transferred to the main supply base, and then routed to the destination line station.

In another embodiment, where different types of parts need to be serviced or repaired, whether at a line station, supply base, or an external supplier, the outage risk for each type of part at each line station and the resupply risk for each type of part at each line station could be retrieved. By analyzing the current outage risk and then the resupply risk, the type of parts could be sorted to reflect the order in which each type of part should be repaired.

In one embodiment, a method for inventory management comprises receiving an indication of a removal of a first resource at a first location, calculating a risk value associated with the first resource at the location, determining if the risk value is less than a predetermined threshold, and generating a request to transfer a second resource from a second location to the first location.

In another embodiment, a method for inventory management comprises generating a time record that is associated with one of a type of resource at one of a plurality of locations, generating a transit time record that is associated with one of a type of resource at one of a plurality of locations, and calculating a plurality of risk values, wherein each one of the plurality of risk values is associated with one of each type of resource at each of the plurality of locations.

In a further embodiment, a computer-readable medium comprises a series of instructions for execution by at least one computer processor, wherein the instructions are for calculating a risk value associated with the number of resources at each of a plurality of locations, receiving notice of a removal of a first resource at a first one of the plurality of locations, calculating a risk value based on the remaining inventory of first resources at the first one of the plurality of locations, determining if the risk value is less than a predetermined threshold, generating a list of a plurality of locations that have an inventory of first resources, and generating a request to transfer a second resource from the inventory of first resources at a second one of the plurality of locations based on a second risk value based on the inventory of first resources at the second one of the plurality of locations.

In yet another embodiment, a system for inventory management comprises a plurality of locations capable of communicating with an operations system, a risk module capable of generating risk values associated with a plurality of parts located at each of the plurality of locations, a time between removal module capable of communicating with the risk module that generates time records, and a transit time module capable of communicating with the risk module that generates transit time records.

In an additional embodiment, a system for inventory management comprises means for calculating a risk value associated with the number of resources at each of a plurality of locations, means for receiving notice of a removal of a first resource at a first one of the plurality of locations, means for calculating a risk value based on the remaining inventory of first resources at the first one of the plurality of locations, means for determining if the risk value is less than a predetermined threshold, means for generating a list of a plurality of locations that have an inventory of first resources, and means for generating a request to transfer a second resource from the inventory of first resources at a second one of the plurality of locations based on a second risk value based on the inventory of first resources at the second one of the plurality of locations.

While the examples and naming conventions used herein have been related to air travel, it is understood that the system and method for adaptive forecasting could be used in any form of travel or logistics industry, including the rail industry, cruise industry, shipping industry, and bus travel. The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A computer-readable medium that is non-transitory, the computer readable medium comprising a series of instructions for execution by at least one computer processor, the series of instructions comprising:
   instructions for calculating a risk value associated with a number of resources at each of a plurality of locations, each of the resources comprising a part consumed in an industry;
   instructions for receiving notice of a removal of a first resource at a first one of the plurality of locations;
   instructions for calculating a risk value based on the remaining inventory of first resources at the first one of the plurality of locations, comprising:
      instructions for obtaining a time between removal mean value, the time between removal mean value equaling a mean of a plurality of first time values, each first time value equaling the time elapsed between one removal of a first resource from the inventory at the first one of the plurality of locations and a next removal of another first resource from the inventory at the first one of the plurality of locations subsequent to the one removal, and
      instructions for obtaining a transit time mean value, the transit time mean value equaling a mean of a plurality of second time values, each second time value equaling the time elapsed during the transfer of a first resource from a location other than the first one of the plurality of locations to the inventory at the first one of the plurality of locations;
   instructions for determining if the risk value is less than a predetermined threshold;
   instructions for generating a list of a plurality of locations that have an inventory of first resources; and
   instructions for generating a request to transfer a second resource from the inventory of first resources at a second one of the plurality of locations based on a second risk value based on the inventory of first resources at the second one of the plurality of locations.

2. The computer-readable medium of claim 1, wherein the series of instructions further comprises:
   instructions for obtaining a time record associated with the first resource at the first one of the plurality of locations.

3. The computer-readable medium of claim 1, wherein the series of instructions further comprises:
   instructions for obtaining a transit time record associated with the first resource at the first one of the plurality of locations.

4. The computer-readable medium of claim 1, wherein the series of instructions further comprises:
   instructions for calculating the first time values and the second time values.

5. The computer-readable medium of claim 1, wherein instructions for calculating the risk value based on the remaining inventory of first resources at the first one of the plurality of locations comprise:
   calculating the risk value using an override risk calculation.

6. The computer-readable medium of claim 1, wherein instructions for calculating the risk value based on the remaining inventory of first resources at the first one of the plurality of locations comprise:
   calculating the risk value using simulation.

7. The computer-readable medium of claim 1, wherein instructions for calculating the risk value based on the remaining inventory of first resources at the first one of the plurality of locations comprise:
   instructions for obtaining a time record associated with the first resource at the first one of the plurality of locations;
   instructions for obtaining a transit time record associated with the first resource at the first one of the plurality of locations;
   instructions for obtaining a number of the first resource in transit to the first one of the plurality of locations; and
   instructions for obtaining an amount of the first resource at the first one of the plurality of locations.

8. The computer-readable medium of claim 7, wherein instructions for calculating the risk value based on the remaining inventory of first resources at the first one of the plurality of locations further comprise:
   instructions for determining if there is a valid time between removal value and a valid transit time value associated with the first resource; and
   instructions for if there is a valid time between removal value and a valid transit time value associated with the first resource, calculating the risk value using an override risk calculation.

9. The computer-readable medium of claim 7, wherein instructions for calculating the risk value based on the remaining inventory of first resources at the first one of the plurality of locations further comprise:
   instructions for determining if there is a valid time between removal value and a valid transit time value associated with the first resource; and
   instructions for if there is not a valid time between removal value or a valid transit time value associated with the first resource:
      generating a first series of risk values;
      calculating a revised risk value associated with the risk values in the first series;
      calculating an error value associated with the revised risk value;
      calculating a desired number of risk values using the error value;
      calculating additional risk values to form a second series of risk values such that the number of risk values in the first series and the number of risk values in the second series total the desired number of risk values; and
      recalculating the revised risk value using the risk values in the first series and the risk values in the second series.

10. A method comprising:
   calculating, using at least one computer processor, a risk value associated with the number of resources at each of a plurality of locations, each of the resources comprising a part consumed in an industry;
   receiving notice of a removal of a first resource at a first one of the plurality of locations;
   calculating, using the at least one computer processor, a risk value based on the remaining inventory of first resources at the first one of the plurality of locations, comprising:
      obtaining a time between removal mean value, the time between removal mean value equaling the mean of a plurality of first time values, each first time value equaling the time elapsed between one removal of a first resource from the inventory at the first one of the plurality of locations and a next removal of another first resource from the inventory at the first one of the plurality of locations subsequent to the one removal, and obtaining a transit time mean value, the transit time mean value equaling the mean of a plurality of second time values, each second time value equaling the time elapsed during the transfer of a first resource from a location other than the first one of the plurality of locations to the inventory at the first one of the plurality of locations;

determining, using the at least one computer processor, if the risk value is less than a predetermined threshold;

generating, using the at least one computer processor, a list of a plurality of locations that have an inventory of first resources; and generating, using the at least one computer processor, a request to transfer a second resource from the inventory of first resources at a second one of the plurality of locations based on a second risk value based on the inventory of first resources at the second one of the plurality of locations.

11. The method of claim 10, further comprising:
obtaining a time record associated with the first resource at the first one of the plurality of locations.

12. The method of claim 10, further comprising:
obtaining a transit time record associated with the first resource at the first one of the plurality of locations.

13. The method of claim 10, further comprising:
calculating, using the at least one computer processor, the first time values and the second time values.

14. The method of claim 10, wherein calculating the risk value based on the remaining inventory of first resources at the first one of the plurality of locations comprises:
calculating the risk value using an override risk calculation.

15. The method of claim 10, wherein calculating the risk value based on the remaining inventory of first resources at the first one of the plurality of locations comprises:
calculating the risk value using simulation.

16. The method of claim 10, wherein calculating the risk value based on the remaining inventory of first resources at the first one of the plurality of locations comprises:

obtaining a time record associated with the first resource at the first one of the plurality of locations;
obtaining a transit time record associated with the first resource at the first one of the plurality of locations;
obtaining a number of the first resource in transit to the first one of the plurality of locations; and
obtaining an amount of the first resource at the first one of the plurality of locations.

17. The method of claim 16, wherein calculating the risk value based on the remaining inventory of first resources at the first one of the plurality of locations further comprises:
determining if there is a valid time between removal value and a valid transit time value associated with the first resource; and
if there is a valid time between removal value and a valid transit time value associated with the first resource, calculating the risk value using an override risk calculation.

18. The method of claim 16, wherein calculating the risk value based on the remaining inventory of first resources at the first one of the plurality of locations further comprises:
determining if there is a valid time between removal value and a valid transit time value associated with the first resource; and
if there is not a valid time between removal value or a valid transit time value associated with the first resource:
generating a first series of risk values;
calculating a revised risk value associated with the risk values in the first series;
calculating an error value associated with the revised risk value;
calculating a desired number of risk values using the error value;
calculating additional risk values to form a second series of risk values such that the number of risk values in the first series and the number of risk values in the second series total the desired number of risk values; and
recalculating the revised risk value using the risk values in the first series and the risk values in the second series.

* * * * *